(12) United States Patent
Dullinger (10) Patent No.: US 11,517,009 B1
(45) Date of Patent: *Dec. 6, 2022

(54) WEED-E-BUG

(71) Applicant: Lori J. Sommerfield, Eden Prairie, MN (US)

(72) Inventor: Dennis R. Dullinger, Alexandria, VA (US)

( * ) Notice: Subject to any disclaimer, the term of this patent is extended or adjusted under 35 U.S.C. 154(b) by 62 days.

This patent is subject to a terminal disclaimer.

(21) Appl. No.: 16/741,738

(22) Filed: Jan. 13, 2020

Related U.S. Application Data (63) Continuation of application No. 15/257,644, filed on Sep. 6, 2016, now Pat. No. 10,561,137.

(51) Int. Cl.
 *A01M 21/04* (2006.01)
(52) U.S. Cl.
 CPC ................................. *A01M 21/043* (2013.01)
(58) Field of Classification Search
 USPC ...... 47/1.5, 1.7, 57.5, DIG. 11, 58.1 R, 57.6; 427/4; 401/126; 118/270
 See application file for complete search history.

(56) References Cited

U.S. PATENT DOCUMENTS

| | | | | |
|---|---|---|---|---|
| 4,402,696 | A * | 9/1983 | Gulko | A61F 13/0226 424/448 |
| 4,716,677 | A * | 1/1988 | Moore | A01M 21/043 15/220.3 |
| 5,249,389 | A * | 10/1993 | Gallo | A01G 5/00 47/1.41 |
| 5,329,727 | A * | 7/1994 | Dixon | A01M 21/043 15/210.1 |
| 5,499,474 | A * | 3/1996 | Knooihuizen | A01M 21/043 401/10 |
| 5,795,343 | A * | 8/1998 | Yavitz | A61F 15/008 604/289 |
| 6,712,076 | B2 * | 3/2004 | Alexander | A45D 33/24 132/303 |

(Continued)

OTHER PUBLICATIONS

Custom Gasket Manufacturing, 4 pages, [retrieved from internet Jul. 15, 2019 https://web.archive.org/web/20150308010737/https://www.customgasketmfg.com/DieCutGaskets/FoamGaskets] Mar. 8, 2015.*

*Primary Examiner* — Andrea M Valenti
(74) *Attorney, Agent, or Firm* — Albert W. Watkins (57) ABSTRACT

An apparatus and method deliver fluid treatments to a targeted plant. The apparatus comprises a two-piece protective shell joined on one side by a spring-hinge. When the two piece outer protective shell is open, a fluid treatment is applied to a liquid retaining material within the protective shell. A portion of a targeted plant is placed within the open outer protective shell. The two piece outer protective shell is then closed, creating a sealed containment environment that is immediately protected from environmental disturbance, prevents distribution of fluid treatment to non-treated plant materials, and will retain, store, and prevent leakage of the fluid treatment. The closed outer protective shell also clasps the plant portion, forcing contact of the target plant portion with fluid treatment residing on and within the liquid retaining material. The apparatus remains attached to the targeted plant while the fluid treatment is absorbed through systemic plant processes.

14 Claims, 6 Drawing Sheets

(56) References Cited

U.S. PATENT DOCUMENTS

| | | | | |
|---|---|---|---|---|
| D681,877 S | * | 5/2013 | Curry | D28/7 |
| 8,944,709 B2 | * | 2/2015 | Ellsworth | A01M 21/043 |
| | | | | 401/10 |
| 2002/0114657 A1 | * | 8/2002 | Gueret | A45D 34/04 |
| | | | | 401/130 |
| 2006/0236600 A1 | * | 10/2006 | Boegli | A01G 27/00 |
| | | | | 47/1.5 |
| 2008/0060261 A1 | * | 3/2008 | Stevenson | A01M 21/043 |
| | | | | 47/1.5 |
| 2010/0139683 A1 | * | 6/2010 | Smith | A45D 19/012 |
| | | | | 132/208 |
| 2012/0316064 A1 | * | 12/2012 | Ruckart | A01N 25/24 |
| | | | | 504/116.1 |
| 2014/0096489 A1 | * | 4/2014 | Parry | D06F 95/002 |
| | | | | 53/467 |
| 2015/0068550 A1 | * | 3/2015 | Sasaki | A45D 40/222 |
| | | | | 132/295 |

* cited by examiner

WEED-E-BUG

BACKGROUND OF THE INVENTION

1. Field of the Invention

The present invention pertains generally to plant husbandry and more particularly pertains to a plant surface contact material applicator for applying fluid treatments to plants.

2. Description of the Related Art

The cultivation of plants for food and ornamentation is generally known alternatively as either horticulture or plant husbandry. As one of the most basic physiological needs of humans, the cultivation of plants is an extremely old science, dating to pre-historic times. For this same reason, there has been and continues to be an enormous amount of research and development on better ways to cultivate all types of plants.

One challenge that all plants face is competition from other plants. When an undesired plant grows on cultivated ground, it is referred to as a weed. Noteworthy is the fact that the same plant might in other locations be desired or in fact the cultivated plant. For example, in conventional agriculture, plants originating from the residual seeds of previous plantings (e.g. corn) growing in the current year's crop (e.g. soybeans) are considered a "weed" for purposes of the year in which the soybeans are the intended crop. Consequently, the designation of a weed has little to do with the genus and species, but is instead a designator that it has undesirably grown in ground cultivated for another plant. The weed will compete with the cultivated plant for sunlight, water and nutrients in the soil, and can detrimentally affect the ornamental appearance of the cultivated land. For the purposes of the present disclosure, the term "weed" will be understood to refer to any plant that is not desired in its current location for any reason.

Weed control is of course a science that is as old as the science of horticulture, and so there has been much progress through the ages. However, the selected termination of intertwined plant lives, one desirable and the other not, continues to be a challenge yet today, regardless of whether mechanical or chemical techniques are used. Terminating the undesired plant often results in the termination of the desired plant.

Early weed control techniques that are still in use centuries later include the basic pulling or ripping of the weed from the soil, tilling, and chopping or hoeing of the weed at or near to the surface of the ground. These mechanical methods of weed control are effective, but are also quite disruptive to the cultivated ground. One issue with this disruption has to do with the aforementioned intertwined plants, which will also commonly have intertwined roots. Consequently, removing a weed to the roots may disrupt or destroy too many of the roots of the desired plant. In addition, and all too commonly, the disruption of the soil will lead to the introduction or exposure of other weed seeds that will germinate and once again proliferate. Consequently, the mechanical methods are not only disruptive to adjacent cultivated plants, these methods also require frequent repeated treatments, consuming much time and effort. Another disadvantage of the mechanical methods is that the disrupted soil may also be more susceptible to erosion by wind and water, which will not only reduce the intrinsic quality of the soil, but if too significant will also erode the soil adjacent the upper roots of the cultivated plants, thereby adversely affecting the desired plants.

Another technique of much more recent development is the use of special chemicals that target subsets of plants, commonly referred to as selective or targeted herbicides. These chemicals have been developed based upon unique biochemical processes that allow a particular chemical compound to interfere with essential processes that only are found in one subset of plants. For exemplary purposes, there are a number of chemicals that specifically target the so-called broadleaf weeds, while not killing grasses. These types of chemicals have found extensive application in food production and lawn care, since broad classes of plants that would be weeds may be chemically eradicated with relatively simple and quick broadcasting of the herbicide. Techniques such as spraying, sprinkling, dusting, and sowing are used to distribute the herbicide, without the need for a person to treat individual plants. As a result, these compounds have proven to be enormous labor savers in many agricultural applications.

Another type of herbicide is one that is quite broad-spectrum, killing all but a few types of plants that have either intrinsic or genetically engineered resistance to the herbicide. These broad spectrum herbicides in combination with genetically engineered plants have also revolutionized the methods and techniques used in large scale food production, in many cases enabling a technique referred to as "no-till" farming that can greatly reduce the mechanical operations required, saving labor, fuel, and wear and tear on machinery. Further, with less mechanical operations and ground exposure, there is often less erosion of the soil as well. As a result, such herbicides have had enormous commercial success for many years, and are widely used in farming. One exemplary and well known example of this is the herbicide Round-Up® originally created and sold by Monsanto Corporation described for example in U.S. Pats. Nos. 3,799,758 by Franz, entitled "N-phosphonomethyl-glycine phytotoxicant compositions"; and 4,405,531 by Franz, entitled "Salts of N-phosphonomethylglycine", the teachings and contents which are incorporated herein by reference.

Homeowners have also used these broad-spectrum herbicides for many years, for purposes such as weed eradication in and around driveways, sidewalks, fences, and along the edges of buildings and trees. Just as in agriculture, a person can quickly spray the plants with the broad-spectrum herbicide, and thereby remove all plants. As noted above, this type of weed eradication tends to be more effective and longer-lasting than mechanical methods, and so homeowners too have widely adopted the use of these broad spectrum herbicides.

Unfortunately, these "broadcast" methods used to apply herbicides on cultivated plants reduce the desired concentration on the specific plants to be treated, increase the cost of the chemicals, and subject vegetation far removed from the treatment area to the chemicals due to "drift", "vaporization," "translocation," or "leaching". Nevertheless, the labor savings have to date far outweighed the disadvantages.

These herbicidal compounds have been much less useful for many smaller vegetable and ornamental gardens. These smaller gardens tend to have many diverse plant species in relative proximity to each other. The diverse plant species found in smaller gardens makes it often impossible to find an herbicide that does not also kill at least some of the cultivated species. This means that the herbicide must be applied much more carefully than in a typical agricultural situation. Overspray, which may only be a small amount of mist that drifts to an adjacent plant, can kill nearby plants in a smaller vegetable and ornamental garden. The same is true for dust-type chemicals. In either case, a surprise sprinkle or light rain can splash the chemical from a treated plant to an adjacent plant.

To avoid the difficulties associated with the broadcast methods, the individual application of chemicals has been made by hand to selected plants. Selective application has permitted the use of highly potent but relatively safe non-selective herbicides for the control of weeds and other undesirable vegetation. A preferred kind of non-selective herbicide is a 41% solution of isopropylamine salt of N-(phosphonomethyl) glycine, described in U.S. Pat. Nos. 3,799,758 and 4,405,531 incorporated by reference herein above.

Spot application of non-selective herbicide is typically made with hand-held sprayers, plastic squeeze bottles, hypodermic syringes, and paint brushes. Another known method of spot applications is to use a rubber glove having an outer absorbent mitten or sponge which can be dipped in a container of herbicide solution and then wiped against undesired vegetation. Several known methods involving this same sponge method applied by tongs or rollers are known. Exemplary U.S. patents and published applications, the teachings and contents which are incorporated herein by reference, include: 1,606,860 by Winn, entitled "Weed eliminator"; 2,659,918 by Stoner, entitled "Weed destroying device"; 2,887,708 by Kane, entitled "Dispenser for dispensing liquid by brush, swab or rod application"; 2,979,757 by Smith, entitled "Weed-killer applicator"; 3,096,534 by Jones, entitled "Applicator for liquid weed-killer"; 4,027,986 by Patrick, entitled "Herbicide applicator"; 4,187,638 by Hardy et al, entitled "Method and apparatus for applying chemicals to weeds and plants"; 4,276,718 by Keeton et al, entitled "Herbicide application"; 4,276,719 by Keeton et al, entitled "Herbicide roller application"; 4,291,491 by Maddock, entitled "Liquid herbicide applicator"; 4,305,224 by Maddock, entitled "Apparatus for selective application of herbicide"; 4,403,881 by Keeton, entitled "Hand held herbicide applicator with flexible cap and valve element"; 4,409,755 by Maddock, entitled "Hand held liquid herbicide applicator"; 4,543,743 by Keeton et al, entitled "Herbicide applicator"; 4,716,677 by Moore, entitled "Manual devices and methods for selective application of chemical substances to plants"; 4,803,801 by Nelson, Jr, entitled "Weed-beater"; 4,908,981 by Moore, entitled "Devices and methods for selective application of herbicide"; 4,947,580 by Moore, entitled "Manual devices and methods for selective application of chemical substances to plants"; 5,135,171 by Gill et al, entitled "Container for a liquid for attachment to equipment for delivering the liquid"; 5,216,833 by Longer, entitled "Herbicide applicator"; 5,329,727 by Dixon, entitled "Topical herbal treatment applicator"; 5,499,474 by Knooihuizen, entitled "Method and apparatus for liquid application"; 5,505,019 by Paulson, entitled "Pesticide applicator and composition"; 5,544,443 by Steglich, entitled "Sprayer retrofit unit for specific area herbicide application"; 5,555,673 by Smith, entitled "Method and apparatus for applying liquid"; 5,561,945 by Kamochi et al, entitled "Method of killing noxious insects by application of insecticide with pliers"; 5,682,612 by Schwarz, entitled "Applicator glove and method of use"; 5,724,765 by Wegner, entitled "Herbicide applicator with vegetation grabbing jaws"; 6,014,836 by Chester, entitled "Hand-held herbicide applicator"; 6,065,244 by Randle, entitled "Plant spray shield method"; 6,233,866 by King et al, entitled "Plant attachment device for killing obnoxious plants"; 8,418,400 by Wiese-Martin et al, entitled "Liquid herbicide applicator"; 8,567,116 by Hall, entitled "Herbicide delivery apparatus"; 8,663,176 by Rad, entitled "Chemical applicator"; 8,944,709 by Ellsworth, et al, entitled "Fluid application device"; 8,998,524 by Shoaf, entitled "Liquid application device"; 2002/0104259 by Tofani, Jr et al, entitled "Method and device for the controlled delivery of herbicides and pesticides"; 2008/0060261 by Stevenson, entitled "Herbicide application apparatuses and application methods"; and 2013/0149021 by Kast, entitled "Applicator device". As this list evidences, and as noted herein above, there has been and continues to be an enormous amount of research and development on new techniques of application of herbicides for weed control purposes.

While these aforementioned methods and devices are suitable for applying herbicide to a rather large area of plants by sweeping the applicator or sponge across the undesired vegetation or to isolated plants by blotting them with the tip of the applicator or sponge, considerable care must be taken to avoid contact with desirable grasses, plants or shrubs as injury may occur. Therefore, these devices are not especially suited for applying herbicide to weeds that are surrounded by and in close proximity to desired plants. Also, the exposed foliage of many kinds of plants is not sufficiently stiff to receive a desired amount of herbicide merely la contact or wiping against an applicator or sponge. Finally, and undesirably, these aforementioned methods and apparatus leave the treated area exposed. This means the treatment is exposed to environmental disturbance; exposed for possible contamination of adjacent or local desirable plants; and is available for ingestion or absorption by other inhabitants of the environment such as pets and children.

Recognizing the need for more controlled application of herbicidal substances, some artisans have designed semi- or solid compositions. Exemplary U.S. patents and published applications, the teachings which are incorporated herein by reference, include: 4,088,473 by Linton, entitled "Herbicidal composition for weed control"; 5,883,045 by Wada et al, entitled "Method for the treatment of plants with agrochemical tablet compositions"; 6,063,393 by Tsuboi et al, entitled "Plant treatment agents"; 6,117,819 by Priesnitz et al, entitled "Herbicide implants for plants"; 6,191,071 by Simon et al, entitled "Plant-treatment agents"; 6,528,079 by Podszun et al, entitled "Shaped bodies which release agrochemical active substances"; 6,528,569 by Oza et al, entitled "Solid water-soluble or water-dispersible compositions"; 6,680,065 by Podszun et al, entitled "Shaped bodies which release agrochemical active substances"; and 6,841,599 by Landham et al, entitled "Solid composition"; 2008/0050433 by Roreger et al., entitled "Water-Soluble Films for Releasing Active Substances". Unfortunately, these aforementioned methods and apparatus also often leave the treated area exposed. While the semi and solid substances are often less affected by environmental disturbance, and are less likely to contaminate adjacent or local desirable plants, the treatments are available for ingestion or absorption by other inhabitants of the environment such as pets and children. Furthermore, these solid or semi-solid treatments are also absorbed much more slowly into the plants, and as a result require far more exposure time in order to kill a weed.

Other artisans recognizing this same need for more controlled application of herbicidal substances, but also seeking to maintain the more rapid delivery of liquids or dusts, have designed patches that may be applied to plants. Exemplary U.S. and Foreign patents and published applications, the teachings which are incorporated herein by reference, include: 2,389,870 by Reevely, entitled "Carrier and applicator for the treatment of trees"; 2,947,111 by Zobrist, entitled "Systemic fungicidal solution and method of application"; 4,402,696 by Gulko, entitled "Folded applicator"; 5,162,052 by Hoffmann et al, entitled "Device for the release of systemic active substances to plants and the use thereof"; 5,201,925 by Itzel et al, entitled "Device for transcuticular application of active substances to plants"; 5,343,653 by Itzel et al, entitled "Device for transcuticular application of active substance to plants"; 5,525,130 by Beaudry, entitled "Plant development affecting device and method"; 5,689,913 by Beaudry, entitled "Plant development affecting device and method"; 5,866,141 by Tojo et al, entitled "Patch preparations for treating plants"; 5,873,196 by Hoffmann et al, entitled "Implantable device for the administration of active substances to plants"; 2006/0201063 by Huon, entitled "Plant delivery apparatus and method"; 2006/0236600 by Boegli, entitled "Point-of-use liquid application device"; 2012/0316064 by Ruckart, entitled "Treatment applicator"; and GB 2,212,063 by Haywood, entitled "Application of chemicals such as systemic herbicides and insecticides". These techniques overcome a number of the limitations of the other techniques, including isolating the herbicide from the environment and from adjacent plants. However, the treated area remains undesirably exposed to ingestion or absorption by other inhabitants of the environment such as pets and children. Furthermore, plants have varying surface chemistries and geometries, rendering these patches unsuitable for many weeds. For exemplary purposes, few adhesives will stick well to plant leaves having pronounced cuticular and epicuticular wax, and so may easily come off or be unintentionally removed and adhered to a pet or child brushing up against the treated plant. Similarly, a patch will not seal tightly to a highly textured plant leave, and will instead expose the herbicide undesirably to the environment and animals. In addition, many of these patches can be quite difficult to handle, particularly by the elderly or those with less manual dexterity. Finally, such patches are necessarily single use, owing to the adhesive film. This means that any herbicide residue remaining on the patch will be disposed of with the dead plant, and may still much later adversely affect other plants, or alternatively may still end up as a contaminant in the environment.

As may be apparent, in spite of the enormous advancements and substantial research and development that has been conducted, there still remains a need for a quick and simple to use, resuable, environmentally isolated liquid applicator that can apply a treatment liquid for an extended duration.

Additional patents of varying relevance, the relevant teachings and contents which are incorporated herein by reference, include: 2,908,923 by Schlechter, entitled "Lens cleaning device"; 3,048,878 by Gray et al, entitled "Eyeglass Liquid Applicator Device"; 375,057 by Pertick, entitled "Sponge cup"; 4,126,962 by Polcaro, entitled "Plant care device"; 4,275,970 by Morrison et al, entitled "Plant care kit"; 4,480,352 by Eggett, entitled "Apparatus for cleaning lenses, mirrors and the like"; 4,493,574 by Redmond et al, entitled "Dispenser package having fault line protrusion"; 4,546,517 by Caniglia, entitled "Wiping device"; 5,249,389 by Gallo, entitled "Tool for removing pollen from lilies"; 8,505,554 by Smith, entitled "Applicator for a hair treatment composition for improved hair strand effects"; 8,689,809 by Curry et al, entitled "Cosmetic color applicator and method for using same"; Des 234,569 by Kilham, entitled "Weed killer"; Des 261,221 by Pluenneke, entitled "Underside wick hand-held rope wick applicator"; Des 262,179 by Hardy et al, entitled "Wick apparatus for applying chemicals to weeds or plants"; Des 262,180 by Hardy et al, entitled "Wick device for applying chemicals to weeds or plants"; Des 290,576 by Bird et al, entitled "Foam pad for feeding and polishing plant leaves"; Des 410,824 by Kownacki et al, entitled "Decorative storage device for a garden hose"; Des 435,405 by Clark, entitled "Storage device for a garden hose in the shape of a frog"; Des 492,168 by Weiser et al, entitled "Whimsical garden stake"; Des 492,554 by Weiser et al, entitled "Unitary wire stake"; and Des 503,594 by Weiser et al, entitled "Garden stake".

In addition to the foregoing patents, Webster's New Universal Unabridged Dictionary, Second Edition copyright 1983, is incorporated herein by reference in entirety for the definitions of words and terms used herein.

SUMMARY OF THE INVENTION

In view of the foregoing disadvantages inherent in the known types of fluid applicators for applying fluid treatments to plants now present in the prior art, the present invention provides a new fluid applicator construction wherein the same can be utilized for applying fluid treatments, such as herbicides, pesticides, fertilizers, colorings, and other treatments to plants as may be desired.

In a first manifestation, the invention is a plant surface contact material applicator. The applicator has an interior configured to apply a fluid treatment to a targeted plant in a protected manner that isolates the fluid treatment solely to the targeted plant and which isolates the fluid treatment from an exterior of the plant surface contact material applicator. A first outer protective shell and a second outer protective shell are coupled through a coupler. In a first coupler position, the first and second outer protective shells are to coupled about a portion of a targeted plant and define a containment environment interior thereof and isolate the fluid treatment and targeted plant portion therein. In a second coupler position, the first and second outer protective shells are at least partially decoupled to thereby expose the containment environment to the exterior of the plant surface contact material applicator.

In a second manifestation, the invention is a plant surface contact protected liquid material applicator. A first outer protective shell terminates at a rim. A first liquid retaining material is securely coupled within and partially protruding from the first outer protective shell. A second outer protective shell terminates at a rim. A second liquid retaining material is securely coupled within and partially protrudes from the second outer protective shell. A hinge couples the first outer protective shell to the second outer protective shell. A clasp is distal to the hinge and configured in a first position to couple the first outer protective shell to the second outer protective shell about a portion of a targeted plant, and thereby define a substantially sealed containment environment interior thereof, and to isolate the fluid treatment and targeted plant portion therein. The clasp is configured in a second position to at least partially decouple the second outer protective shell from the first outer protective shell and thereby expose the containment environment to the exterior of the plant surface contact material applicator.

In a third manifestation, the invention is a method of applying a treatment liquid to a targeted plant. According to the method, a protective shell is opened. The treatment liquid is introduced to a liquid retaining material placed within the opened protective shell. A foliage portion of the targeted plant having first and second opposed major surfaces is placed within the opened protective shell. The foliage portion of the targeted plant is clasped within the opened protective shell and the opened protective shell is fully closed. At least one of the first and second major surfaces of the clasped foliage portion is biased into contact with the treatment liquid residing on and within the liquid retaining material.

OBJECTS OF THE INVENTION

Exemplary embodiments of the present invention solve inadequacies of the prior art by providing two protective shells joined on one side by a spring-hinge and on the other by a clasp providing a sealed containment environment within the two shells when closed. The inside of one or both shells contains a liquid retaining material. The fluid treatment is applied to the liquid retaining material. When closed, the device will retain and prevent leakage of liquids placed on the enclosed materials. A portion of the plant material to be treated is placed between the two shells and the device is closed. The device remains in place while the plant material absorbs the fluid treatment which is immediately protected from environmental disturbance and prevents distribution of the fluid treatment to non-treated plant materials. In these respects, the fluid applicator according to the present invention substantially departs from the conventional concepts and designs of the prior art, and in so doing provides an apparatus primarily developed for the purpose of applying fluid treatments, such as herbicides and pesticides in a protective environment to plant materials.

The present invention and the preferred and alternative embodiments have been developed with a number of objectives in mind. While not all of these objectives are found in every embodiment, these objectives nevertheless provide a sense of the general intent and the many possible benefits that are available from embodiments of the present invention.

A first object of the invention is to provide a fluid applicator for applying fluid treatments, such as herbicides, pesticides, and other treatment compositions to plants that is both quick to apply and simple to use. A second object of the invention is to provide a fluid applicator which is of a durable and reliable construction susceptible of a low cost of manufacture with regard to both materials and labor, and which accordingly is then susceptible of low prices of sale to the consuming public, and which may be easily and efficiently marketed, thereby making such fluid applicator economically available to the buying public. Another object of the present invention is to provide an herbicide applicator having a self-contained supply of herbicide that will be delivered to the active surface of the herbicide applicator for an extended duration. Yet another object of the present invention is to immediately and throughout the treatment period protect the treated area from mechanical environmental disturbance such as foot traffic, and conversely to immediately and throughout the treatment period protect non-treated areas from coming in contact with the treated area. An additional object is to apply fluid treatments using an apparatus that will prevent inadvertent absorption and contact by other inhabitants of the environment, such as pets, children, and wildlife. A further object of the invention is to insure that the operation of the herbicide applicator is unaffected by contamination by grass clippings or foreign objects. Still another object of the invention is to provide a fluid applicator that may be used to apply fluid treatments to plants in high winds and shortly before, after, or during periods of natural precipitation such as rain or precipitation caused by irrigation systems. A further object of the present invention is to provide a fluid applicator that allows a user to accurately distribute fluid treatments on to plants. A related object is that the applicator be capable of applying substantial positive pressure to a small, pliable plant without bending or displacing the plant substantially, thereby avoiding possible contact with other adjacent plants during application. Another object of the invention is to provide an applicator which can be stored and handled with an internal supply of liquid chemicals without danger of accidental contact or release of the chemicals. A related object is for such an applicator to be capable of being re-filled and re-used.

BRIEF DESCRIPTION OF THE DRAWINGS

The foregoing and other objects, advantages, and novel features of the present invention can be understood and appreciated by reference to the following detailed description of the preferred embodiment, taken in conjunction with the accompanying drawings, in which.

DESCRIPTION OF THE PREFERRED EMBODIMENT

Figure 1:
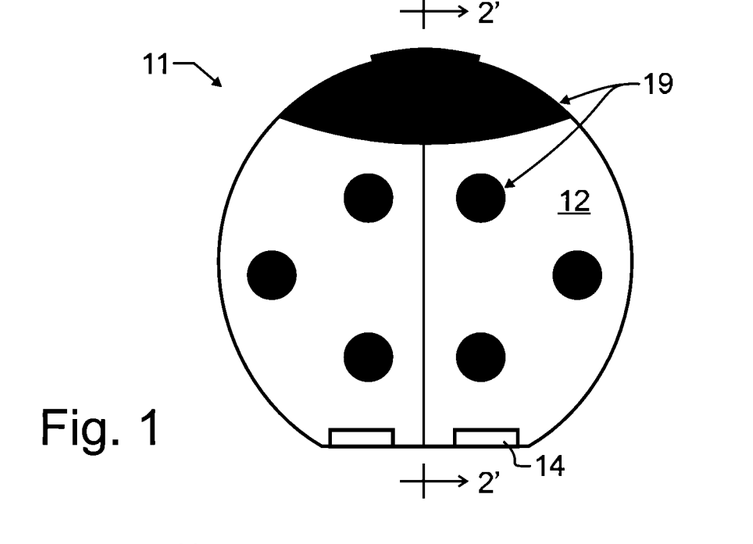
FIG. 1 illustrates a preferred embodiment fluid applicator designed in accord with the teachings of the present invention from a top plan view.
Figure 2:
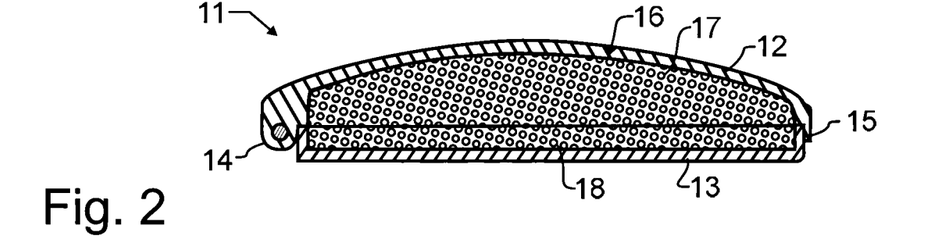
FIG. 2 illustrates the preferred embodiment fluid applicator of FIG. 1 taken from a sectional vie along section line 2' of FIG. 1.
Figure 3:
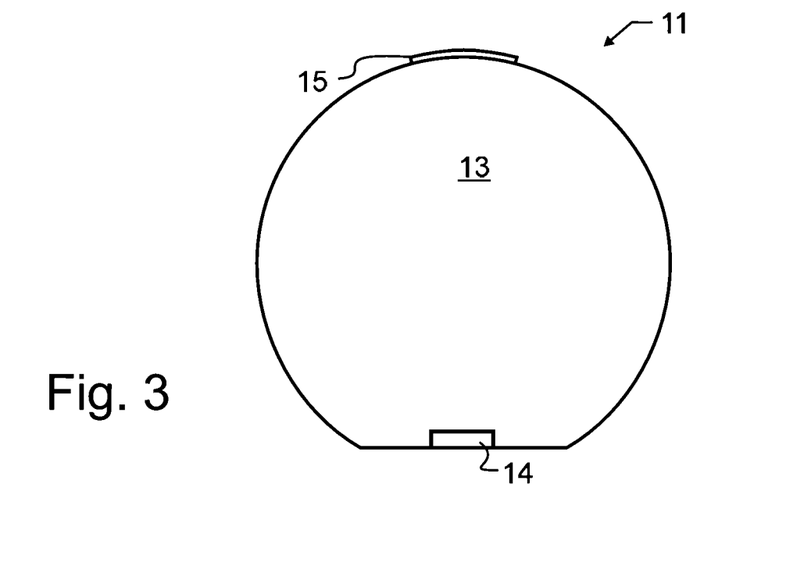
FIG. 3 illustrates the preferred embodiment fluid applicator of FIG. 1 from a bottom plan view.

Manifested in the preferred embodiment, the present invention provides a quick and simple to use, resuable, environmentally isolated liquid applicator that can apply a treatment liquid for an extended duration to a weed, in an aesthetically pleasing manner. As illustrated in FIGS. 1-3, preferred embodiment fluid applicator 11 generally comprises two outer protective shells 12, 13, joined on one side by a hinge 14. When the two outer protective shells 12, 13 are closed such as illustrated in these Figures, by pivoting one with respect to the other about hinge 14, on an interior they define a sealed containment environment 16. To secure preferred embodiment fluid applicator 11 in a closed position, and thereby isolate sealed containment environment 16 from the external environment, a clasp 15 is provided. The inside of both outer protective shells 12, 13 contain liquid retaining materials 17, 18, respectively.

Outer protective shells 12, 13 may be of numerous geometries and appearances, while maintaining the same function. For aesthetic and marketing reasons, the preferred embodiment will be familiar and popular garden representations of insects, mammals, birds and reptiles. In preferred embodiment fluid applicator 11, a lady bug representation 19 has been illustrated in FIG. 1 for exemplary purposes. Noteworthy here is that a lady bug has a domed generally disk shaped body, as does preferred embodiment fluid applicator 11. In the case of other representations, this disk shape may be maintained with different representations printed or formed thereon, or in further alternative embodiments contemplated herein, other geometries resembling the exterior geometries of the living creatures may also be adopted.

The function of outer protective shells 12, 13 is to isolate sealed containment environment 16 from the external environment, as noted herein above. In essence these outer protective shells 12, 13 could in their simplest form be thought of as impermeable membranes. However, in order to accomplish this objective of isolation that can withstand environmental variations and animals such as pets and wildlife, then there are several additional opposing considerations in the design of these shells that must be accounted for. One of these is the need for a sufficiently rigid outer protective shell that a small animal or child chewing on the shell will not likely break or puncture the outer shell. Consequently, a relatively strong and less frangible material is preferable. In consideration thereof, ordinary plastic films that are only one or a few millimeters in thickness are inadequate. Outer protective shells 12, 13 are preferably configured to withstand ordinary chewing by children and wildlife without failure. Furthermore, outer protective shells 12, 13 also ensure that the operation of preferred embodiment fluid applicator 11 is unaffected by contamination by grass clippings or foreign objects, or by mechanical environmental disturbance such as foot traffic. Conversely, outer protective shells 12, 13 also ensure that immediately and throughout the treatment period non-treated areas are protected from coming in contact with the treatment liquid.

However, there will also be temperature changes, such as those between day and night and the like, and a totally rigid outer shell and tight seals would lead to excessive pressure changes within sealed containment environment 16 compared to the outside barometric pressure. In other words, with a totally rigid outer shell and impervious seals, then even relatively small temperature deviations from when a fluid applicator was closed would lead to major pressure differentials between the inside and outside of preferred embodiment fluid applicator 11. When the temperature rises, this would lead to a pressure increase inside sealed containment environment. Such pressure increases could damage any seals between outer protective shells 12, 13, or could alternatively lead to undesirable expulsion of treatment liquid. When the temperature drops, a vacuum could develop within sealed containment environment 16, which could lead to an undesirable failure or collapse of outer protective shells. Since these extreme pressures are only developed if outer protective shells 12, 13 are totally rigid, even a small or moderate amount of flexibility will allow outer protective shells 12, 13 to change shape enough to allow preferred embodiment fluid applicator to expand and contract, and thereby change volume sufficiently to accommodate temperature changes without significantly changing the internal pressure within sealed containment environment 16.

Outer protective shells 12, 13 may be fabricated from many different suitable materials, but in the preferred embodiment are preferably fabricated from molded plastic. Outer protective shells 12, 13 will preferably be configured to have a combination of chemical resistance to all intended treatment liquids, suitability for a suitable molding or manufacturing process, and sufficient strength and durability to withstand inquisitive small children, pets, and wildlife. Plastics as a group are generally resilient enough to also accommodate the necessary expansion and contraction to avoid significant pressure changes within sealed containment environment 16. Exemplary materials that meet the remaining requirements include the variety of polyethylenes, including especially Ultra-High Molecular Weight (UHMW) polyethylene and High Density polyethylene (HDPE). Low Density polyethylene (LDPE) and polypropylene (PP) may also be suitable. Each of these materials will preferably be treated or compounded with suitable ultraviolet inhibitors and other additives suitable or desirable for the present application as known by those skilled in compounding and chemistry of plastics. Each of these materials has excellent chemical resistance, and is readily available, of low cost, and is readily fabricated into specific geometries. Nevertheless, there are a myriad of other plastic compositions that would also be suitable. Other materials that may find application, for exemplary purposes only and not solely limiting the present invention thereto, include: nylon; Acrylonitrile-Butadiene-Styrene (ABS); other various co-polymers and engineered plastics; and various natural and synthetic relatively higher durometer rubbers including Thermo-Plastic Elastomers (TPE).

Hinge 14 may be of any suitable construction, but will preferably have a spring characteristic that will tend to open outer protective shells 12, 13 to expose liquid retaining materials 17, 18. This resilience is desirable to enable a person to open clasp 15, and in turn have hinge 14 open the outer protective shells 12, 13. With hinge 14 operative to spread outer protective shells 12, 13 apart, the person may then readily apply the desired treatment liquid directly to liquid retaining materials 17, 18. When outer protective shells 12, 13, are fabricated from a material that is intrinsically quite resilient, such as polypropylene, nylon, ABS, and TPE, the hinge may be of a simple construct known as a living hinge. A living hinge is fabricated from the same material as the outer protective shells 12, 13, but due to geometry is relatively more flexible than the outer protective shells. This geometrical difference may be simply providing a thinner or narrower section of material for the living hinge region, or the hinge region may be flat while the outer protective shells 12, 13 are domed. Alternatively, where outer protective shells 12, 13 are fabricated from a less resilient material, a separate spring mechanism may be provided. In preferred embodiment fluid applicator 11, the hinge may further comprise a stable point when outer protective shells 12, 13 are spread open to provide hands-free access to liquid retaining materials 17, 18, and to also provide a closing force when in the closed position of FIG. 2. Hinge 14 is illustrated as a simple pinned hinge, wherein a portion of outer protective shell 12 in the hinge region presses against a sidewall or lip of outer protective shell 13 when rotated, causing the resilience of outer protective shell 13 to act as the spring force, and yet allowing this hinge region to snap past the sidewall or lip of outer protective shell 13 and be stable in the open position. Again, any of the myriad of known hinges may be provided and incorporated herein.

Clasp 15 may likewise take on any suitable construction, and can comprise any suitable mechanical analog, including such devices as hasps, latches, catches, hooks, fasteners, buckles, snaps, clamps, and so forth. In preferred embodiment fluid applicator 11, a geometry that may be readily formed during the molding or other formation of outer protective shells 12, 13 is most preferred, in reducing the cost of fabrication and assembly. However, a designer must weight this against the liquids which are intended to be applied, and the relative difficulty of opening preferred embodiment fluid applicator 11, which will serve as a protective barrier to entry and access to those liquids. For liquids which are relatively safe for consumption, a simpler clasp 15 as illustrated in the Figures may be used, with the understanding that some children and some pets and wildlife may potentially open preferred embodiment fluid applicator 11. However, if a particularly dangerous or toxic material is to be applied, a much more secure child-proof and wildlife-proof fastener may then be desired or required.

Liquid retaining materials 17, 18 are preferably fabricated from an absorbent material such as woven fabric or sponge. Most preferably, these liquid retaining materials 17, 18 are also capable of receiving and holding a sufficient amount of treatment liquid to adequately treat a plant for an extended duration. Liquid retaining materials 17, 18 may be fabricated as individual pads, and preferably the pads are then adhesively bonded or otherwise affixed or secured to their respective outer protective shells 12, 13.

For applying a liquid chemical or solution, clasp 15 is released, and hinge 14 spreads outer protective shells 12, 13 apart, thereby exposing liquid retaining materials 17, 18. A treatment liquid may then be applied to liquid retaining materials 17, 18, for exemplary purposes only and not limiting the present invention solely thereto, by use of a small squeeze bottle containing the liquid treatment composition. In an alternative embodiment, liquid retaining materials 17, 18 may be pre-applied at the factory, allowing a person to skip this step of application of a treatment liquid. As may be apparent, preferred embodiment fluid applicator 11 can be stored and handled in the closed position illustrated in FIG. 2, with an internal supply of liquid treatment chemicals and without danger of accidental contact or release of the chemicals. As long as outer protective shells 12, 13 are fabricated from reasonably durable materials as described herein above, preferred embodiment fluid applicator 11 may also be re-filled and re-used as desired.

Preferred embodiment fluid applicator 11 is preferably designed for and so may be used for applying many different fluid treatments, such as herbicides, pesticides, and fertilizers, to plants. However, many of the features of the present invention are optimized for the application of herbicides to individually targeted weeds, which heretofore has been a challenging task. Once a treatment liquid is applied, such as by dispensing from the small squeeze bottle, the liquid is preferably absorbed into liquid retaining materials 17, 18.

Figure 4:
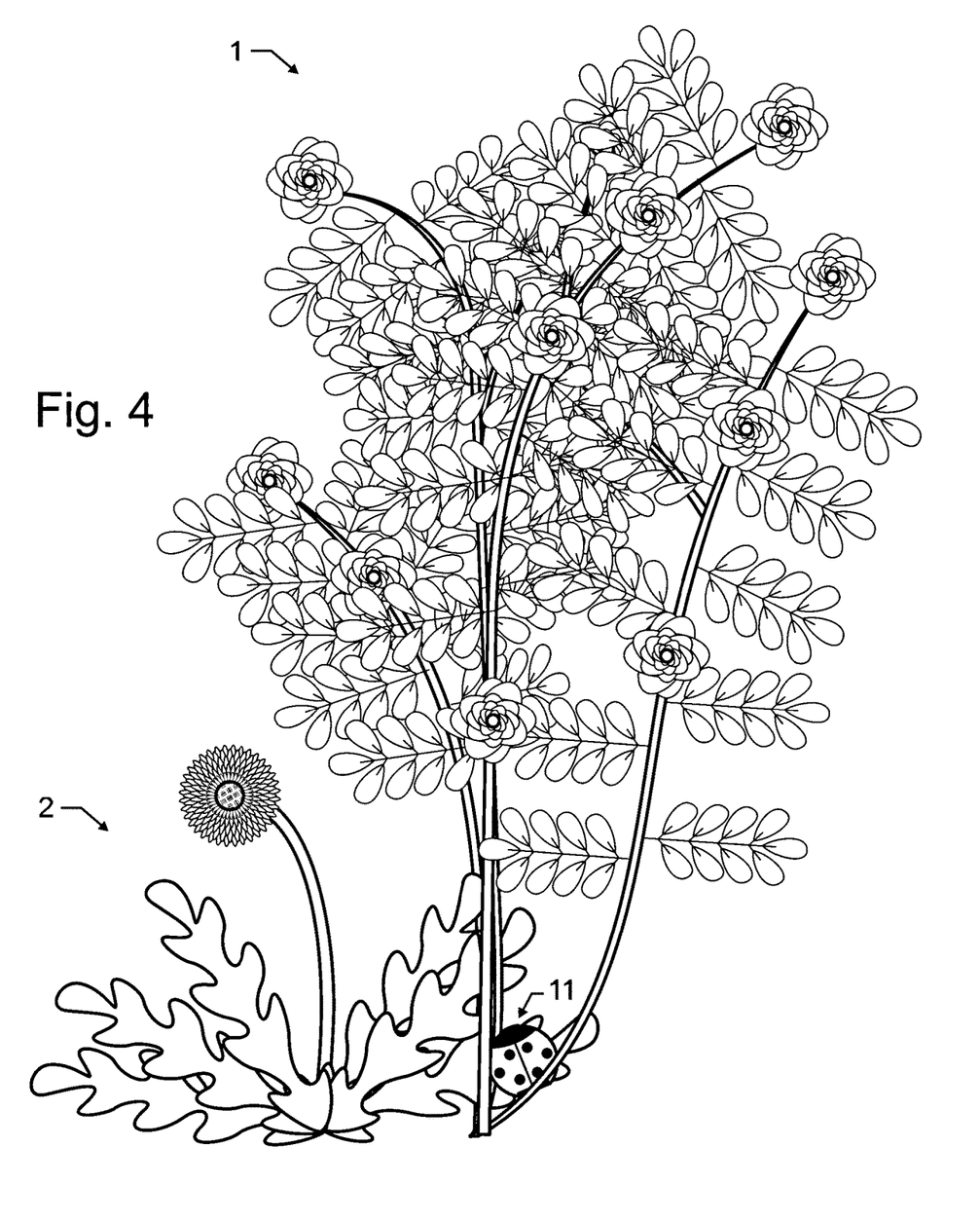
FIG. 4 illustrates the preferred embodiment fluid applicator of FIG. 1 in further combination with a weed, both immediately adjacent to a cultivated plant, from a side elevational view.
Figure 5:
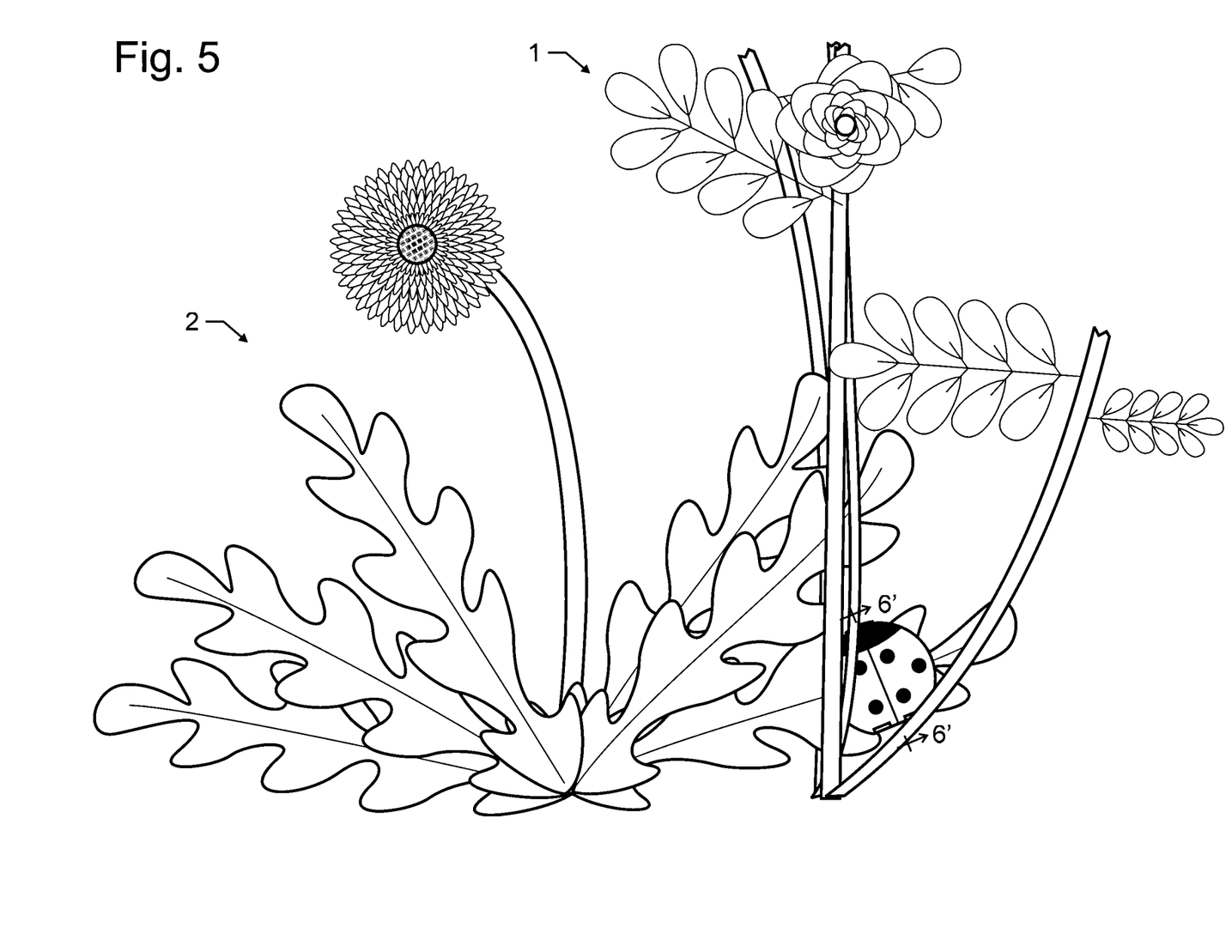
FIG. 5 illustrates the combination preferred embodiment fluid applicator, weed, and cultivated plant of FIG. 4 from an enlarged side elevational view.
Figure 6:
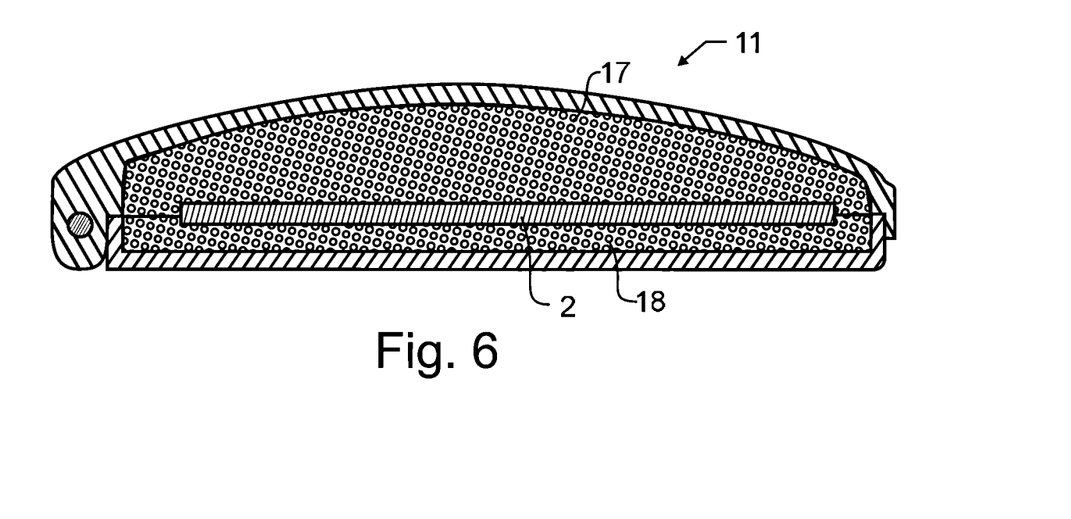
FIG. 6 illustrates the combination preferred embodiment fluid applicator and weed leaf of FIG. 5 from a sectional view taken along section line 6' in FIG. 5.
Figure 7:
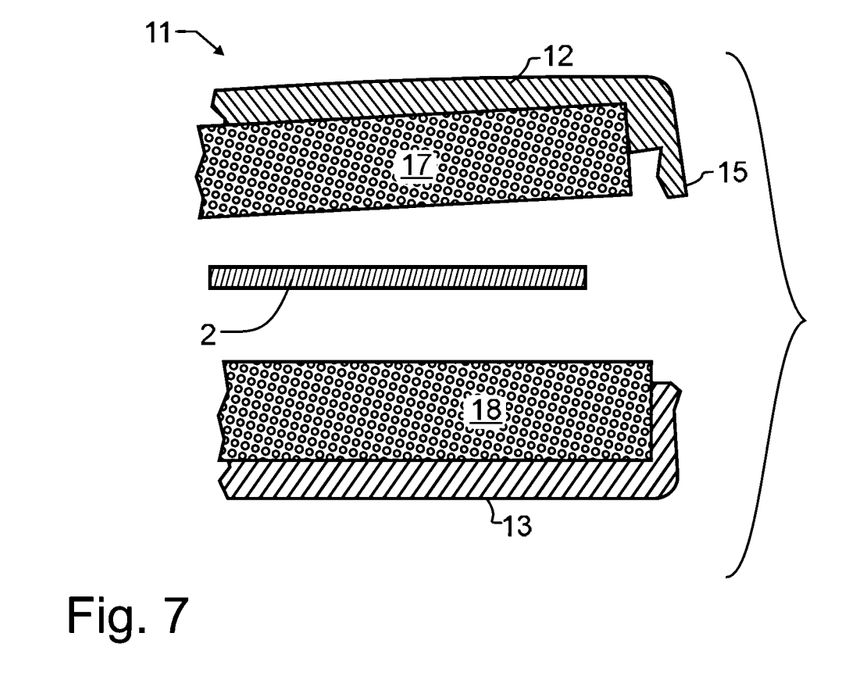
FIG. 7 illustrates a combination preferred embodiment fluid applicator and weed leaf similar to that of FIG. 6, just prior to clasping the fluid applicator about the weed leaf, from an enlarged sectional view.

A portion of a plant to be treated is placed between outer protective shells 12, 13 such as illustrated in FIG. 7, and the two shells are closed together to engage clasp 15 such as illustrated in FIG. 6. If the treatment liquid is sufficiently absorbed into liquid retaining materials 17, 18, then there will be no splashing or spilling of the treatment liquid during closing. When closed, preferred embodiment fluid applicator 11 will retain treatment liquids therein and prevent leakage of such treatment liquids out of sealed containment environment 16. Most preferably, and enabled by the combination of opposed hinge 14 and clasp 15, preferred embodiment fluid applicator 11 does not have to puncture weed 2, and instead may simply span a leaf or portion thereof such as illustrated in FIGS. 4 and 5. This makes installation easier, and also avoids damaging a vital vein that may transport the treatment liquid into the plant. As may be apparent, preferred embodiment fluid applicator 11 is extremely quick to apply and simple to use, and may be applied to a plant in high winds and shortly before, after, or during periods of natural precipitation such as rain or precipitation caused by irrigation systems. Furthermore, since there is no unidirectional force applied to the targeted plant such as weed 2 during installation, and instead all of the application force is applied squeezing outer protective shells 12, 13 together, this geometry applies substantial positive pressure to a small, pliable plant without bending or displacing the plant substantially, thereby avoiding possible contact with other adjacent plants during application.

While only a single preferred embodiment fluid applicator 11 is illustrated in FIGS. 4 and 5, it will be appreciated that any number of such applicators 11 may be applied to apply a treatment liquid to a plant. Furthermore, owing to the ease of clasping preferred embodiment fluid applicator 11 onto a plant leaf, both the quantity and the placement of applicators 11 may be precisely chosen.

While a reasonable seal between preferred embodiment fluid applicator 11 and the plant matter is desired, preferred embodiment fluid applicator 11 will most preferably not close so tightly or with so sharp a border as to severe the plant matter. For the treatment to be effective, the treatment liquid must be absorbed through the leaf or other plant portion into the veins, and a severed portion will not allow systemic absorption. Preferred embodiment fluid applicator 11 will preferably remain in place while the plant material absorbs the fluid treatment. This is illustrated in exemplary form in FIGS. 4 and 5, which show preferred embodiment fluid applicator 11 clasping weed 2 in a location immediately adjacent to cultivated plant 1, while isolating treatment liquid within sealed containment environment 16 to contact and be absorbed only by weed 2.

One way of ensuring a good seal without undue force on the plant matter is to provide a gentle pressure, which may then be a part of the design constraints for outer protective shells 12, 13, hinge 14, and clasp 15. A gently contoured rim on the tops of the outer protective shell 12, 13 sidewalls may for exemplary and non-limiting purposes provide sufficient seal or isolation. Alternatively, this contoured rim might further be combined with a gap between liquid retaining materials and this rim. In yet a further alternative embodiment, a soft and non-porous gasket might be provided at the tops of outer protective shell 12, 13 sidewalls.

In yet another alternative, if one or both of liquid retaining materials 17, 18 are configured to slightly protrude from their associated outer protective shells 12, 13 such as illustrated in FIG. 7, then the inherent compressibility associated with sponges, woven or non-woven fabric, and many other liquid retaining materials will allow these liquid retaining materials 17, 18 to alternatively serve as a reasonable seal around the periphery of the junction between outer protective shells 12, 13. Consequently, in preferred embodiment fluid applicator 11, sealed containment environment 16 is preferably formed by some combination of the closure geometry and features of outer protective shells 12, 13, and the presence of liquid retaining materials 17, 18.

The slight protrusion of both of these liquid retaining materials 17, 18 from their associated outer protective shells 12, 13 such as illustrated in FIG. 7, which may assist with proper closure and sealing, may also help to ensure that both liquid retaining materials 17, 18 will be gently pressed against weed leaf 2 upon closing into the position illustrated by FIG. 6. This will ensure firm contact between weed 2 and liquid retaining materials 17, 18, thereby also ensuring good transfer of a treatment liquid into weed leaf 2.

Several embodiments of apparatus designed in accord with the present invention have been illustrated in the various figures. The embodiments are distinguished by the tens digit, and various components within each embodiment designated by the ones digit. However, many of the components are alike or similar between embodiments, so numbering of the ones digit has been maintained wherever possible, such that identical, like or similar functions may more readily be identified between the embodiments. If not otherwise expressed, those skilled in the art will readily recognize the similarities and understand that in many cases like numbered ones digit components may be substituted from one embodiment to another in accord with the present teachings, except where such substitution would otherwise destroy operation of the embodiment. Consequently, those skilled in the art will readily determine the function and operation of many of the components illustrated herein without unnecessary additional description.

Figure 8:
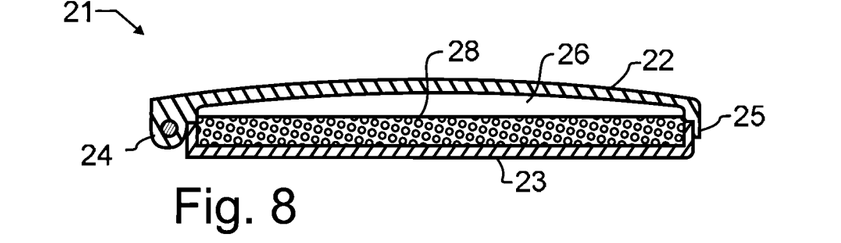
FIG. 8 illustrates a first alternative embodiment fluid applicator designed in accord with the teachings of the present invention from a sectional view similar to section line 2' of FIG. 1, to directly contrast the differences of this first alternative embodiment to FIG. 2.

First alternative embodiment fluid applicator 21 is illustrated in FIG. 8, in a closed, sectional view very much resembling that of FIG. 2. However, and as is apparent from a comparison of FIGS. 2 and 8, this first alternative embodiment fluid applicator 21 has only a single liquid retaining material 28 nested into outer protective shell 23, and protruding upward slightly therefrom into an interior of outer protective shell 22. This combination of outer protective shells 22, 23 form a sealed containment environment 26, when clasp 25 is closed such as illustrated in FIG. 8.

Figure 9:
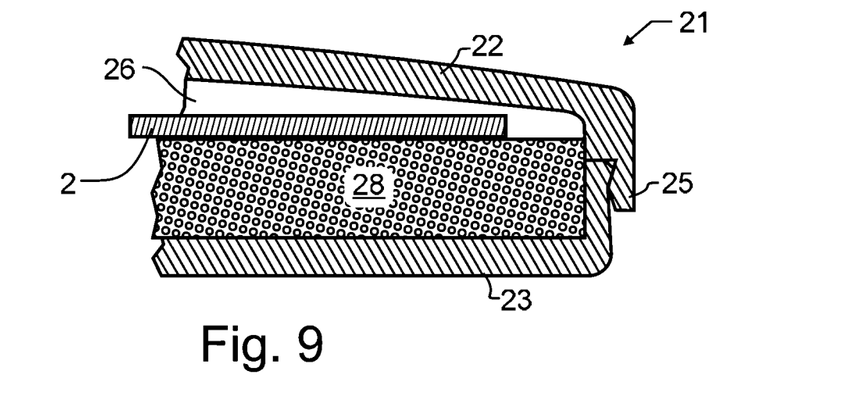
FIG. 9 illustrates the combination first alternative embodiment fluid applicator and weed leaf similar to that of FIG. 6 but from an enlarged sectional view.
Figure 10:
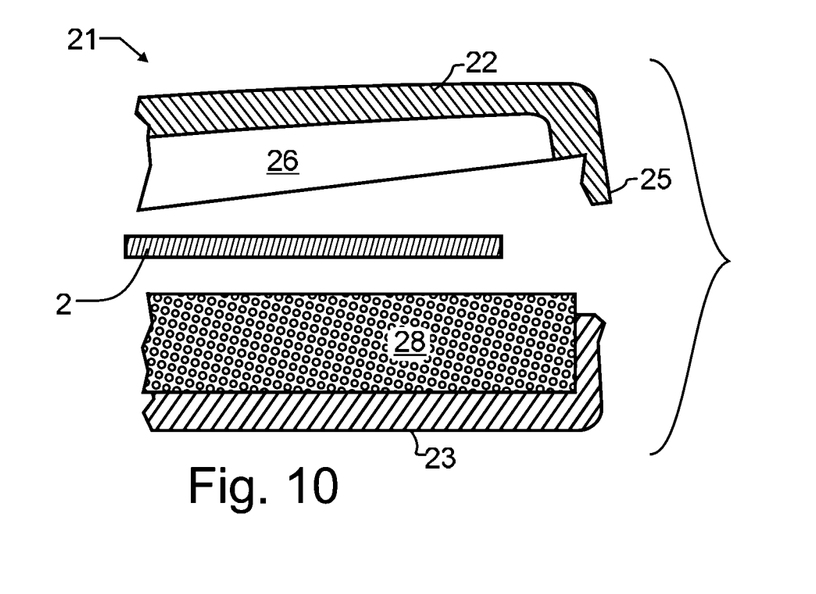
FIG. 10 illustrates the combination first alternative embodiment fluid applicator and weed leaf similar to that of FIG. 7, just prior to clasping the fluid applicator about the weed leaf, from an enlarged sectional view also similar to that of FIG. 7.

FIG. 9 illustrates the combination of this first alternative embodiment fluid applicator 21 and a weed leaf 2 similar to that of the preferred embodiment of FIG. 6, but from an enlarged sectional view. Likewise, FIG. 10 illustrates the combination first alternative embodiment fluid applicator 21 and weed leaf 2, just prior to clasping the fluid applicator about the weed leaf similar to that of FIG. 7, from an enlarged sectional view also similar to that of FIG. 7. As may be apparent from these Figures, in this first alternative embodiment fluid applicator 21, weed leaf 2 will be gently pressed upward by liquid retaining material 28, and will in most instances both weed leaf 2 and liquid retaining material 28 will deform slightly under the intrinsic pressure of liquid retaining material 28 pressing into adjacent outer protective shell 22 beyond the junction between two outer protective shells 22, 23. This will also ensure firm contact between weed 2 and liquid retaining material 28.

Figure 11:
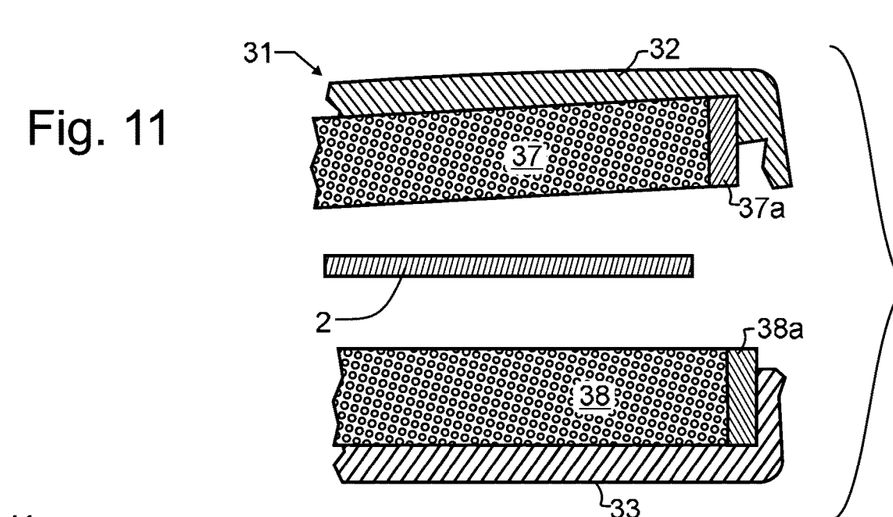
FIG. 11 illustrates a second alternative embodiment fluid applicator designed in accord with the teachings of the present invention in combination with and just prior to clasping the fluid applicator about a weed leaf from a sectional view similar to that of FIG. 10, to directly contrast the differences of this second alternative embodiment to FIG. 10.

As noted herein above with reference to the preferred embodiment fluid applicator 11, there are several alternative ways to ensure a good seal between the outer protective shells without undue force on the plant matter. One of these is illustrated in FIG. 11, where second alternative embodiment fluid applicator 31 is provided with a pair of annular bands 37a, 38a of relatively soft and compressible but fluid impermeable material adjacent to and surrounding the adjacent liquid retaining materials 37, 38, respectively. Annular bands 37a, 38a may, for exemplary but non-limiting purposes, comprise: a closed cell foam; the exterior skin formed within a self-skinning foam; a very low durometer impervious rubber; a waterproof and breathable material that resists the passage of water and other fluids while allowing gases to pass through; and known alternatives or equivalents thereto.

Figure 12:
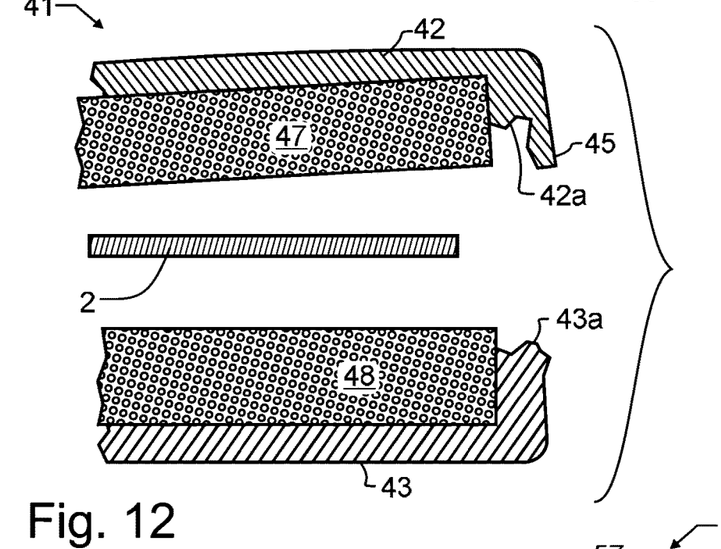
FIG. 12 illustrates a third alternative embodiment fluid applicator designed in accord with the teachings of the present invention in combination with and just prior to clasping the fluid applicator about a weed leaf from a sectional view similar to that of FIG. 10, to directly contrast the differences of this third alternative embodiment to FIG. 10.

A second alternative way to ensure a good seal between the outer protective shells without undue force on the plant matter is illustrated in FIG. 12, where second alternative embodiment fluid applicator 41 is provided with a pair of gently contoured rims 42a, 43a on the tops of the outer protective shell 42, 43 sidewalls which may for exemplary and non-limiting purposes provide sufficient seal or isolation. Alternatively, this contoured rim might further be combined with a gap between liquid retaining materials and this rim. In yet a further alternative embodiment, a soft and non-porous gasket might be provided as a part of or in addition to gently contoured rims 42a, 43a at the tops of outer protective shell 42, 43 sidewalls.

In yet another alternative, if one or both of liquid retaining materials 17, 18 are configured to slightly protrude from their associated outer protective shells 12, 13 such as illustrated in FIG. 7, then the inherent compressibility associated with sponges, woven or non-woven fabric, and many other liquid retaining materials will allow these liquid retaining materials 17, 18 to alternatively serve as a reasonable seal around the periphery of the junction between outer protective shells 12, 13. Consequently, in preferred embodiment fluid applicator 11, sealed containment environment 16 is preferably formed by some combination of the closure geometry and features of outer protective shells 12, 13, and the presence of liquid retaining materials 17, 18.

Figure 13:
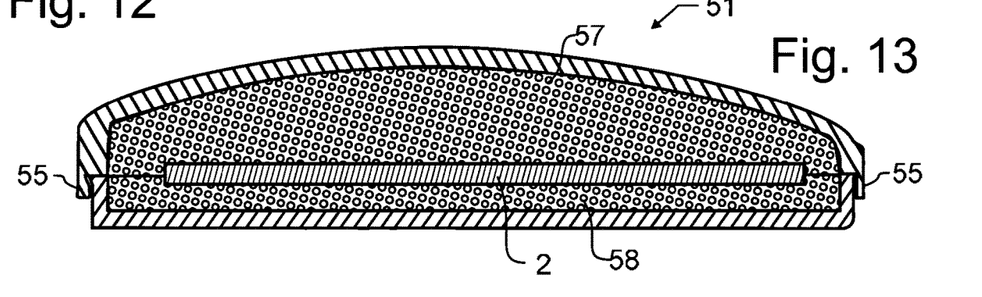
FIG. 13 illustrates in combination a fourth alternative embodiment fluid applicator designed in accord with the teachings of the present invention from a sectional view similar to that of FIG. 6, to directly contrast the differences of this fourth alternative embodiment to FIG. 6.

Hinge 14 and clasp 15 in preferred embodiment fluid applicator 11 work cooperatively together to couple outer protective shells 12, 13. While a hinge 14 is most preferred, as hinge 14 greatly simplifies the handling and installation of preferred embodiment fluid applicator 11, it will be understood that in a fourth alternative embodiment fluid applicator 51 illustrated in FIG. 13, outer protective shells 52, 53 may be disconnected entirely from each other prior to application to a targeted plant or weed 2, and that at least a second clasp 55 may be provided, for exemplary and non-limiting purpose in the location of and instead of hinge 14. In such case, both of the two clasps 55 work cooperatively together to couple the two outer protective shells 52, 53. Outer protective shells 52, 53 must be manually aligned, and then snapped together about the leaf of a targeted plant such as weed 2 to engage both clasps 55.

As can be appreciated in light of the foregoing disclosure, a preferred or alternative embodiment of the invention may provide a fluid applicator which is of a durable and reliable construction susceptible of a low cost of manufacture with regard to both materials and labor, and which accordingly is then susceptible of low prices of sale to the consuming public. In view of the intuitive geometry and operation, a preferred or alternative embodiment of the invention also may be easily and efficiently marketed, thereby making such fluid applicator economically available to the buying public.

While the foregoing details what is felt to be the preferred and alternative embodiments of the invention illustrative of the principles of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

I claim:

1. A contact protected plant surface liquid material applicator, comprising:
    a first outer impermeable protective shell having a first outer protective shell base and a first outer protective shell side wall rising from said first outer protective shell base that terminates distally to said first outer protective shell base at a first outer protective shell rim defining a first outer protective shell interior space;
    a first liquid retaining material securely coupled within said first outer protective shell interior space and in an uncompressed state partially protruding from said first outer protective shell interior space beyond said first shell rim;
    a second outer impermeable protective shell having a second outer protective shell base and a second outer protective shell side wall rising from said second outer protective shell base that terminates distally to said second outer protective shell base at a second outer protective shell rim;
    a second liquid retaining material securely coupled within said second outer protective shell interior space and in an uncompressed state partially protruding from said second outer protective shell interior space beyond said second outer protective shell rim;
    a hinge coupling said first outer protective shell to said second outer protective shell; and
    a clasp located distal to said hinge and configured in a first position to couple said first outer protective shell rim to said second outer protective shell rim about a portion of a targeted living plant, compress said first liquid retaining material and said second liquid retaining material in contact with said targeted living plant portion to thereby transfer a living plant treatment liquid to said targeted living plant portion, and define a sealed containment environment interior thereof that includes both of said first and second outer protective shell interior spaces and said first liquid retaining material and said second liquid retaining material that in combination isolate and seal said living plant treatment liquid and said targeted living plant portion therein while securing said contact protected plant surface liquid material applicator in place coupled to said targeted living plant and simultaneously preserving at least one vein within the targeted living plant intact that transports said living plant treatment liquid from at least one of said first liquid retaining material and said second liquid retaining material through said portion of said targeted living plant into another portion of said targeted living plant, and configured in a second position to at least partially decouple said second outer protective shell rim from said first outer protective shell rim and thereby expose said containment environment to said exterior of said plant surface contact material applicator, wherein when said clasp is in said second position said first liquid retaining material protrudes from said first outer protective shell and said second liquid retaining material protrudes from said second outer protective shell.

2. The contact protected plant surface liquid material applicator of claim 1, wherein said first outer protective shell rim in vertical plane cross-section further comprises a sinuate geometry and said second outer protective shell rim in vertical plane cross-section further comprises a sinuate geometry complementary to said first outer protective shell sinuate geometry.

3. The contact protected plant surface liquid material applicator of claim 1, further comprising a fluid retaining seal located and configured to seal between said first and second outer protective shell rims when said clasp is in said first position.

4. The contact protected plant surface liquid material applicator of claim 1, further comprising a fluid impermeable annular band adjacent to said first outer protective shell rim and encompassing said first liquid retaining material.

5. The contact protected plant surface liquid material applicator of claim 1, wherein said living plant treatment liquid comprises at least one of an herbicide, a pesticide, and a fertilizer.

6. A plant surface contact material applicator, comprising:
    a first outer impermeable protective shell having a base, and having a side wall rising from said base that terminates distally to said base at a rim;
    a second outer impermeable protective shell configured to couple with said first outer impermeable protective shell; said first outer protective shell further comprises said rim in vertical plane cross-section having a sinuate geometry and said second outer protective shell further comprising a rim in vertical plane cross-section having a sinuate geometry complementary to said first outer protective shell sinuate geometry;
    an interior that contains a living plant fluid treatment and is defined within said first and second outer impermeable protective shells;
    a liquid retaining material within said interior and retaining at least a portion of said living plant fluid treatment contained within said interior; and
    a clasp configured in a first closed position to couple and retain said first outer impermeable protective shell to said second outer impermeable protective shell about a portion of a targeted living plant, compress said liquid retaining material in contact with said targeted living plant portion to thereby transfer said living plant fluid treatment to said targeted living plant portion, and define a sealed containment environment that includes both of said first and second outer protective shell interior spaces and said liquid retaining material that in combination isolate and seal a living plant treatment liquid and said targeted living plant portion therein while securing said contact protected plant surface liquid material applicator in place coupled to said targeted living plant and simultaneously preserving at least one vein within the targeted living plant intact that transports said living plant fluid treatment from said liquid retaining material through said portion of said targeted living plant into another portion of said targeted living plant, said clasp configured in a second open position to at least partially decouple said second outer impermeable protective shell from said first outer impermeable protective shell, said liquid retaining material protruding beyond said rim of said side wall from said interior when said coupler is in said second open position.

7. The plant surface contact material applicator of claim 6, further comprises:
 a hinge continuously coupled between said first outer protective shell and said second outer protective shell; and
 said clasp coupled between said first outer protective shell and said second outer protective shell when said clasp is in said first position.

8. The plant surface contact material applicator of claim 6, wherein said clasp further comprises:
 a first clasp coupled between said first outer protective shell and said second outer protective shell when said clasp is in said first position and otherwise disconnected from at least one of said first outer protective shell and said second outer protective shell; and
 a second clasp distal from said first clasp and coupled between said first outer protective shell and said second outer protective shell when said clasp is in said first position and otherwise disconnected from at least one of said first outer protective shell and said second outer protective shell.

9. The plant surface contact material applicator of claim 6, wherein said liquid retaining material is affixed to an inner surface of said first outer protective shell.

10. The plant surface contact material applicator of claim 9, further comprising a fluid impermeable annular band adjacent to said rim and encompassing said liquid retaining material.

11. The plant surface contact material applicator of claim 10, wherein said fluid impermeable annular band further comprises a fluid impermeable foam, and wherein said fluid impermeable foam, a first portion of said first outer protective shell inner surface, and said portion of a targeted living plant are configured to retain, store, and prevent leakage of said living plant fluid treatment from within said interior to said exterior of said plant surface contact material applicator when said clasp is in said first closed position and thereby isolate application of said living plant fluid treatment solely to said targeted living plant portion.

12. The plant surface contact material applicator of claim 6, wherein said liquid retaining material further comprises a liquid retaining sponge.

13. The plant surface contact material applicator of claim 12, wherein said liquid retaining sponge further comprises:

a first surface adjacent to at least a first portion of an inner surface of said first outer protective shell, and a plant treatment liquid applicator surface displaced from said first surface and relatively more distal to said first portion of said first outer protective shell inner surface by a distance including a thickness of said liquid retaining sponge and configured to apply said living plant fluid treatment to an immediately adjacent targeted living plant, said plant treatment liquid applicator surface enclosed within said interior when said clasp is in said first closed position and exposed to an exterior of said plant surface contact material applicator when said clasp is in said second open position.

14. The plant surface contact material applicator of claim 12, further comprising a second liquid retaining sponge securely coupled within and partially protruding from said second outer protective shell when said clasp is in said second open position.

* * * * *